United States Patent [19]

Lindbert

[11] 4,407,387

[45] Oct. 4, 1983

[54] CONTROL SYSTEM FOR SPLIT AXLE DRIVE MECHANISM

[75] Inventor: Brook A. Lindbert, Utica, Mich.

[73] Assignee: General Motors Corporation, Detroit, Mich.

[21] Appl. No.: 268,580

[22] Filed: May 29, 1981

[51] Int. Cl.³ .................. B60K 17/34; B60K 23/08
[52] U.S. Cl. .................................. 180/247; 180/24.1; 192/0.08; 192/0.096; 192/3.58
[58] Field of Search .................. 180/247, 249, 24.1; 192/3.51, 3.59, 0.096, 0.07, 0.075, 0.08, 3.58; 403/1

[56] References Cited

U.S. PATENT DOCUMENTS

| 2,309,432 | 1/1943 | Alden | 74/314 |
| 2,314,833 | 3/1943 | Keese | 180/248 |
| 3,123,169 | 3/1964 | Young et al. | 180/247 |
| 3,283,298 | 11/1966 | Kaiser | 180/247 |
| 4,298,085 | 11/1981 | Monoto et al. | 180/249 |
| 4,341,281 | 7/1982 | Nagy | 180/247 |
| 4,381,828 | 5/1983 | Lunn et al. | 180/247 |

FOREIGN PATENT DOCUMENTS 2637635 2/1978 Fed. Rep. of Germany ..... 192/3.59

OTHER PUBLICATIONS

Paul Weissler, "AMC's State-of-the-Art 4WD", *Mechanics Illustrated*, Jan. 1981, pp. 68-70, 90.

*Primary Examiner*—David M. Mitchell
*Assistant Examiner*—Pierre L. Huggins
*Attorney, Agent, or Firm*—F. J. Fodale

[57] ABSTRACT

A part-time four-wheel drive vehicle has a transfer case and a split axle drive mechanism for the selectively driving two vehicle wheels. The split axle drive mechanism has a clutch associated with one of the differential side gears for preventing back drive to the transfer case in the two-wheel drive mode. A control system for operating the clutch responsive to the operational mode of the transfer case comprises a vacuum motor and a solenoid operated two-way valve energized by way of a switch in the transfer case. The control system also includes a pneumatic time delay and a vacuum check valve.

8 Claims, 3 Drawing Figures

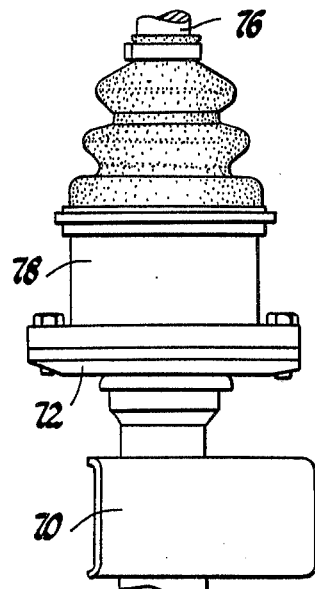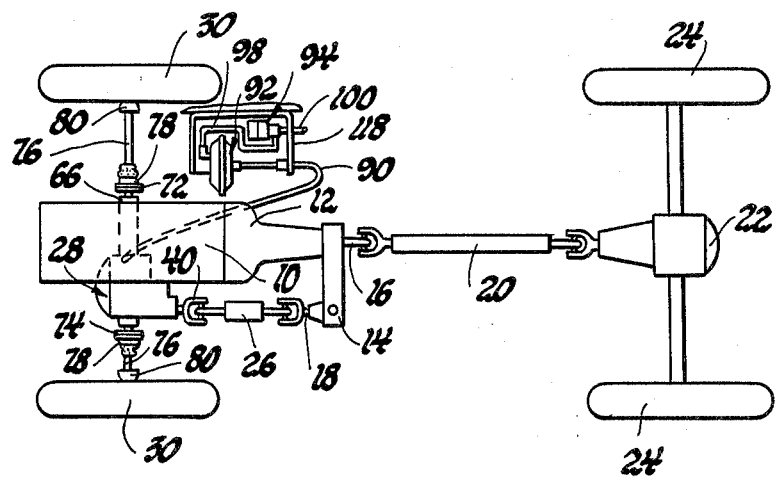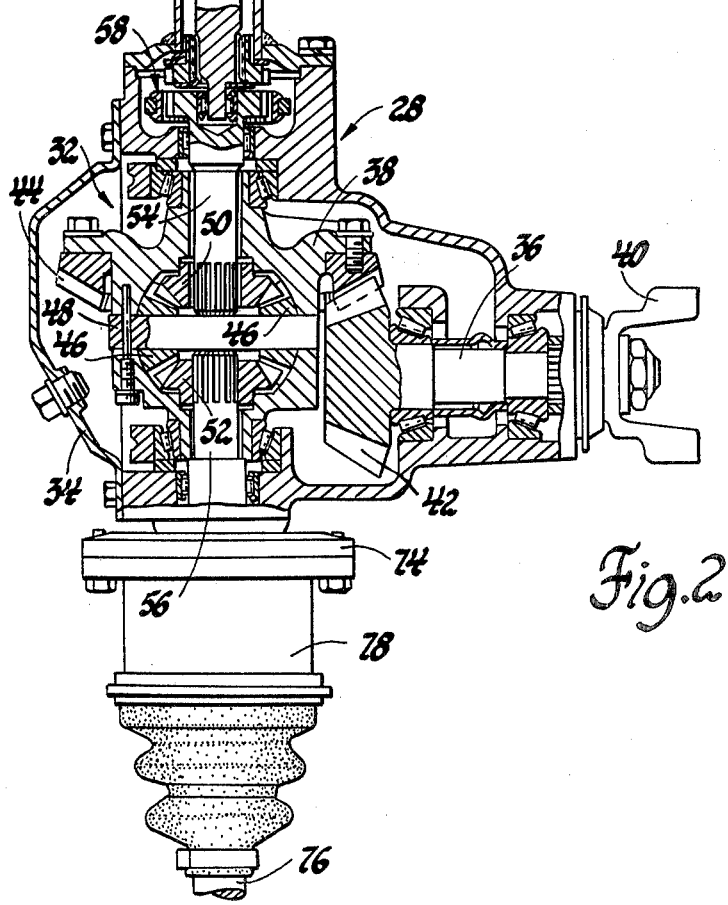
Fig.1
Fig.2

CONTROL SYSTEM FOR SPLIT AXLE DRIVE MECHANISM

This invention relates to a split axle drive mechanism and, more particularly, to a control system for operating the clutch of a split axle drive mechanism which is used in a part-time four-wheel drive vehicle.

A common drive configuration for a part-time four-wheel drive vehicle comprises a transfer case having an input shaft driven by the vehicle transmission and two output shafts. One output shaft is drive connected to the input shaft for continuously driving one set of vehicle wheels, usually the rear wheels, through a propeller shaft, differential and split axle. The second output shaft is connectable to the input shaft by a clutch or the like in the transfer case for selectively driving the other set of vehicle wheels, usually the front wheels, through a second propeller shaft, a differential and split axle. Two-wheel drive is provided when the clutch in the transfer case is disengaged and four-wheel drive when the clutch is engaged.

A long standing problem associated with part-time four-wheel drive configurations of the above-noted type is wear and power consumption in the two-wheel drive mode. This is caused by the non-driven front wheels back driving the drive line components between the non-driven wheels and the clutch or comparable mechanism in the transfer case which disconnects the second or auxiliary output shaft from the transfer case input shaft.

A known solution to reducing wear and power consumption is the use of a single clutch in the axle assembly for the selectively driven wheels which disconnects one of the selectively driven wheels from its associated side gear in the differential when the vehicle is in the two-wheel drive mode. See U.S. patent application Ser. No. 126,561, for a Split Axle Drive Mechanism filed by Laszlo Nagy on Mar. 3, 1980, now U.S. Pat. No. 4,341,281.

The object of this invention is to provide a control system for automatically operating the clutch in the split drive mechanism responsive to the operational mode of the transfer case in a part-time four-wheel drive vehicle.

Another object of this invention is to provide a control system which uses components already on the vehicle as much as possible and thereby minimizing the number of additional components required by the system.

A feature of the invention is that the control system does not require any power to disengage the clutch and, consequently, the control system contributes to fuel economy in the two-wheel drive mode.

Another feature of the invention is that the control system incorporates a time delay between the shift to four-wheel drive in the transfer case and the application of clutch engage forces in the split axle drive mechanism so that four-wheel drive can be selected while the vehicle is in motion.

Yet another feature of the invention is that the control system uses a vacuum motor for engaging and disengaging the clutch and, consequently, the clutch fork can be operated directly by the vacuum motor without the necessity of a complicated shifter mechanism as in the aforesaid patent application.

Still yet another feature of the invention is that the control system includes a vacuum check valve so that the system can operate off of the engine intake manifold.

Still yet another feature of the invention is that the control system is electrically activated and deactivated by a pre-existing switch associated with the transfer case.

Still yet another feature of the invention is that abusive clutch engagement, such as at full throttle, is not possible when the engine is the vacuum source because the available vacuum is not sufficient to actuate the control system.

Still yet another feature of the invention is that the control system uses the engine intake manifold as a vacuum source and a pre-existing switch associated with the transfer case thereby minimizing the number of additional components required by the system.

Other objects and features of the invention will become apparent to those skilled in the art as the disclosure is made in the following detailed description of a preferred embodiment of the invention as illustrated in the accompanying sheets of drawing in which:

FIG. 1 is a schematic plan view of a part-time four-wheel drive vehicle having a split axle drive mechanism and a control system for operating the clutch thereof in accordance with my invention.

FIG. 2 is a partially sectioned plan view of the split axle drive mechanism shown in FIG. 1.

Figure 3:
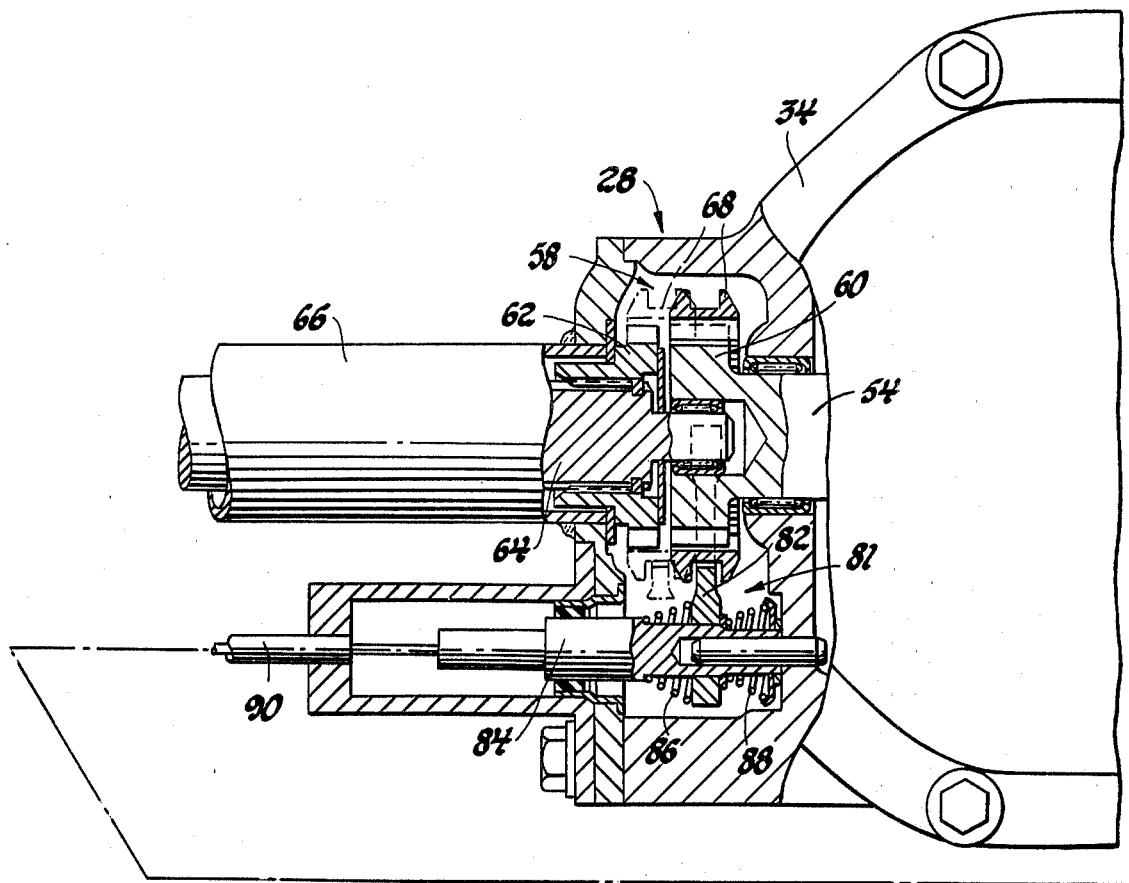
FIG. 3 is a schematic view showing details of the control system and its relationship to other vehicle components.
Figure 3:
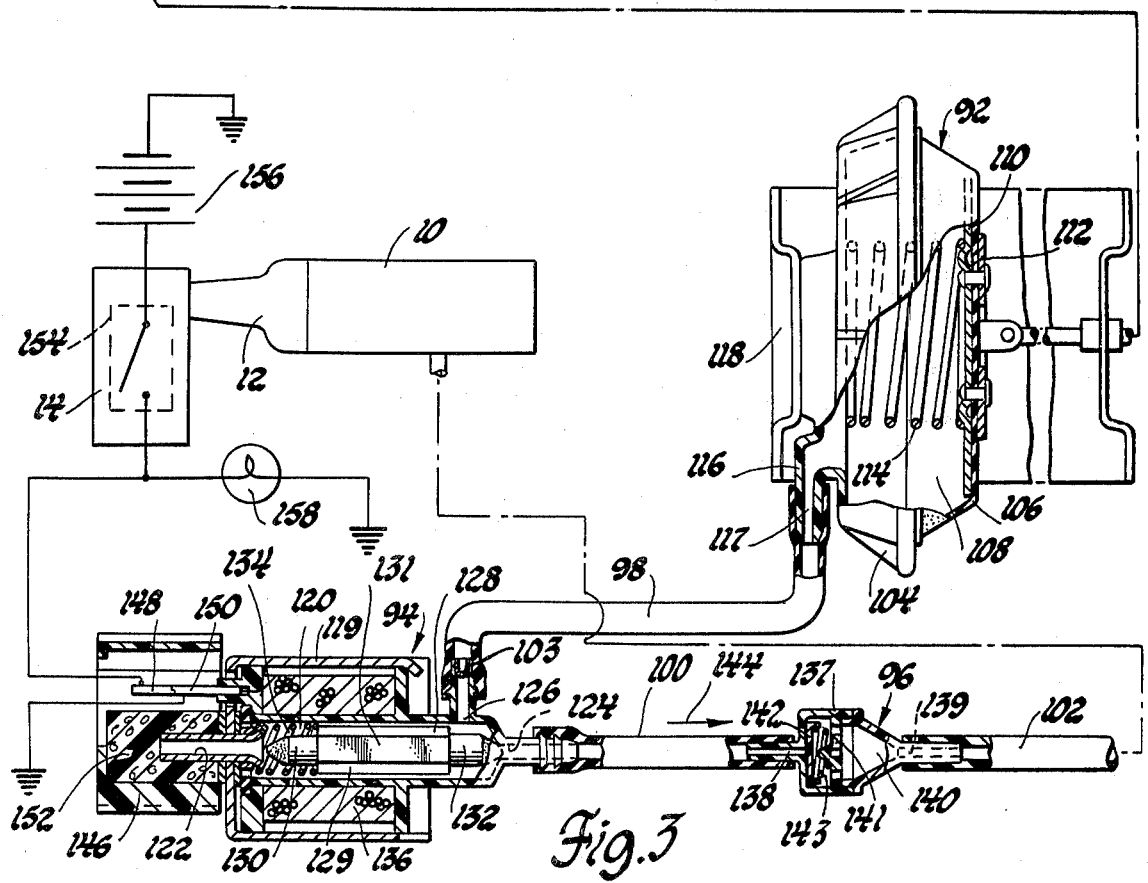

Referring now to the drawing and particularly to FIG. 1, there is shown a schematic plan view of a part-time four-wheel drive vehicle, comprising an internal combustion engine 10, transmission 12 and transfer case 14 mounted on a vehicle chassis (not shown). The engine 10 and transmission 12 are well-known components as is the transfer case 14 which typically has an input shaft (not shown), a main output shaft 16 and an auxiliary output shaft 18. The main output shaft 16 is drive connected to the input shaft in the transfer case 14 and is customarily aligned with it. The auxiliary output shaft 18 is drive connectable to the input shaft by a clutch or the like in the transfer case 14 and customarily offset from it. The transfer case clutch is actuated by a suitable selector mechanism (not shown) which is generally remotely controlled by the vehicle driver.

The main output shaft 16 is drivingly connected to a rear propeller shaft 20 which in turn is drivingly connected to a rear differential 22. The rear differential 22 drives the rear wheels 24 through split axle parts in a well-known manner.

The auxiliary output shaft 18 is drivingly connected to a front propeller shaft 26 which in turn is drivingly connected to a split axle drive mechanism 28 for selectively driving the front wheels 30 through split axle parts.

The Split Axle Drive Mechanism

As shown in FIGS. 2 and 3, the split axle drive mechanism 28 includes an automotive type differential 32 inside a housing 34. The differential 32 has a drive shaft 36 and a differential case 38 rotatably mounted in the housing 34 on orthogonally relaxed axes. The drive shaft 36 is the differential input and has an external yoke 40 at one end for universally coupling the drive shaft 36 to the front propeller shaft 26. The internal end of the drive shaft 36 has an integral driving pinion 42 which meshes with a ring gear 44 attached to the differential case 38. The differential case 38 carries a plurality of rotatable pinion gears 46 mounted on a cross pin 48. The pinion gears 46 mesh with side gears 50 and 52 which are splined to the ends of the stub shafts 54 and 56 respectively. The stub shafts 54 and 56 are rotatably mounted in the housing 34 on the differential case axis. These stub shafts are rotatable relative to each other and to the differential case. The differential 32 as thus far described and its mode of operation are well-known.

The split drive axle mechanism 28 further includes a positive clutch 58 which changes the mode of operation of the differential 32 and makes it particularly useful for the selectively driven wheels in a part-time four-wheel drive vehicle. As shown in FIG. 3, the clutch 58 comprises an integral spline wheel 60 at the outer end of the stub shaft 54 and a matching spline wheel 62 attached to the inner end of an extension shaft 64. The extension shaft 64 has its inner end journalled in the hollow outer end of the stub shaft 54 and its outer end journalled in a bearing (not shown) at the remote end of an extension tube 66 attached to the housing 34.

The clutch 58 further includes an internally splined sleeve 68 which is slidably mounted on the spline wheel 60. The splined sleeve 68 is shiftable between a disengaged position (shown in solid lines in FIGS. 2 and 3) and an engaged position (shown in phantom lines in FIG. 3) where it couples the spline wheels 60 and 62.

The split axle drive mechanism 42 is attached to the vehicle chassis by means of a housing bracket (not shown) and a bracket 70 on the extension tube 66.

The split axle drive mechanism 28 has two outputs for the respective split axle parts associated with the respective front wheels 30. One output is the stub shaft 54, clutch 58 and extension shaft 64 which has an external flange 72 for attaching one of the split axle parts. The other output is the stub shaft 56 which has an external flange 74 for attaching the other split axle part.

Suitable split axle parts, commonly referred to as half shafts, are well-known from front wheel drive automobiles. These may be used for connecting the split axle drive mechanism 28 to the front wheels 30. The drawings schematically illustrate a common type of half shaft for driving connection to independently suspended steerable vehicle wheels comprising an axle shaft 76 having a plunging universal joint 78 at its inboard end adapted for connection to an output such as the flange 72 or 74 and the well-known Rzeppa-type universal joint 80 at its outboard end adapted to be connected to the vehicle wheel 30.

The split axle drive mechanism 28 also includes a shifter 81 for operating the clutch 58. The shifter 81 as shown in FIG. 3 comprises a fork 82 having its tines engaged in an external groove of the sleeve 68 and its base slidably mounted on a slide 84. The fork 82 is positioned on the slide 84 by opposed coil springs 86 and 88. The slide 84 itself is translated by a push-pull cable 90. FIG. 3 shows the fork 82 and the slide 84 in the clutch disengaged position in solid lines. The clutch 58 is engaged by moving the slide 84 to the left from the solid line position shown in FIG. 3. This loads the spring 88 which in turn biases the fork 82 and sleeve 68 toward the left. The sleeve 68 then slides into engagement with the spline wheel 62 under the action of spring 88 when their respective splines align in a complementary manner. The clutch 58 is disengaged by returning the slide 84 to the position shown in FIG. 3. This loads the spring 86 which in turn returns the slide 84 and fork 82 to the clutch disengaged position when the biasing force of spring 86 is sufficient to overcome the torque load on the engaged splines of spline wheel 62 and sleeve 68.

The Control System

A control system for operating the clutch 58 via the push-pull cable 90 and shifter 81 is shown in the lower portion of FIG. 3.

The control system comprises a vacuum motor 92, a solenoid operated two-way slide valve 94, a vacuum check valve 96, three rubber conduits or hoses 98, 100 and 102 and an orifice device 103.

The vacuum motor 92 comprises a hard plastic cup shaped shell 104 and a flexible cup shaped diaphragm 106 attached together rim-to-rim to form a collapsible chamber 108. The bottom wall of the diaphragm 106 is reinforced by plates 110 and 112 which are on opposite sides of the bottom wall and riveted together. The diaphragm 106 is normally extended as shown in FIG. 3 and biased into the extended position by a coil spring 114 inside the chamber 108. The hard plastic shell 104 has a nipple 116 which forms a port 117 for evacuating or venting the chamber 108.

The push-pull cable 90 which operates the shifter 81 for the clutch 58 is attached to an eyelet of the outer plate 112 as shown in FIG. 3 so that the clutch 58 is disengaged when the chamber 108 is vented to atmosphere and the diaphragm 106 of the vacuum motor 92 is extended.

The vacuum motor 92 is mounted on a U-shaped bracket 118 which in turn is fixedly mounted in the engine compartment of the vehicle, such as by fastening the bracket 118 to a body panel as schematically represented in FIG. 1.

The two-way slide valve 94 can also be conveniently mounted on the bracket 118 as shown in FIG. 1. However, the slide valve 94 is shown in a detached position in FIG. 3 for clarity.

The two-way slide valve 94 comprises a sheet metal cup 119 with a plastic spool secured in it to provide a cylindrical valve chamber 120. The valve chamber 120 has coaxial ports 122,124 at opposite ends and a radial port 126. Ports 122 and 124 are vent and vacuum ports, respectively. The orifice device 103 is a bias cup having a small hole through its bottom wall. The cup is mounted in the outer end of the radial port 126 and the radial port 126 is connected to the vacuum motor 92 by the rubber hose 98.

A slide member 128 is disposed in the valve chamber 120. The slide member 128 has stems 130,132 at its opposite ends which cooperate with the respective vent and vacuum ports 122 and 124. The slide member 128 is biased by a coil spring 134 to an extended position where the stem 132 closes the vacuum port 124 as shown in FIG. 3. Consequently, the vacuum motor 92 is normally vented via the open vent port 122.

The valve chamber 120 is surrounded by a solenoid coil 136 which, when energized, retracts the slide member 128 so that the stem 130 closes the vent port 122 and the vacuum port 124 is opened. The enlarged center section 129 of the slide member 128 is a cylinder with four equally spaced flats 131. The cylinder pilots the slide member 128 in the valve chamber 120 while the flats 131 permit flow from one end of the valve chamber 120 to the other, particularly in the vent mode illustrated in FIG. 3 where air flows from the vent port 122 to the vacuum motor 92 via the radial port 126.

The vacuum port 124 is connected to the vacuum check valve 96 by the rubber hose 100. The vacuum check valve 96 comprises a plastic housing 137 having a nipple at each end which form respective suction and discharge ports 138,139 for a valve chamber 140. The suction port 138 is connected to the vacuum port 124 of the slide valve 94 by the hose 100 as indicated above. The discharge port 139 is connected by hose 102 to a vacuum source, such as the intake manifold of the internal combustion engine 10.

The valve chamber 137 has an internal apertured wall 141 which supports a coil spring 143 and a flat plug 142 which is biased by the coil spring to block the suction port 138. The vacuum check valve 96 permits air flow from the slide valve 94 to the vacuum source that is, in the direction of the arrow 144 shown in FIG. 3 but prevents air flow from the vacuum source to the slide valve 94. The vacuum check valve 96 prevents the engine from bleeding down the vacuum motor 92 when the chamber 108 is evacuated.

The solenoid operated two-way slide valve 94 has a plastic socket 146 at the end which has the vent port 122. The socket 146 houses a pair of male blade terminals 148,150 attached to the respective ends of the solenoid coil 136. The socket 146 also houses a filter 152 for the vent port 122.

The electric circuit for energizing the solenoid coil 136 is shown schematically in FIG. 3. By way of background, transfer cases for part-time four-wheel drive vehicles commonly include an electric switch which is closed when the transfer case is in the four-wheel drive mode. The closed switch completes a circuit to an indicator light on the vehicle instrument panel to advise the vehicle driver that the vehicle is in the four-wheel drive mode. See for instance, U.S. Pat. No. 3,283,298 issued to Edgar F. Kaiser on Nov. 1, 1966.

FIG. 3 schematically illustrates a transfer case 14 having a switch 154, it being understood that the switch 154 is operatively connected with the transfer case 14 so that the switch 154 opens when the transfer case 14 is in the two-wheel drive mode and closes when the transfer case 14 is in the four-wheel drive mode.

The switch 154 is electrically connected in series with the vehicle battery 156 and two branch circuits—one having an indicator light 158 and the other having the solenoid coil 136. Consequently, the solenoid coil 136 is also energized when the indicator light 158 is lit responsive to the transfer case 14 being in the four-wheel drive mode.

Operation

The two-wheel drive mode is illustrated in FIGS. 2 and 3. In this mode, the drive to the auxiliary output shaft 18 is disconnected in the transfer case and, consequently, the switch 154 is open. The slide member 128 is extended under the action of spring 134, in a position blocking the vacuum port 124, and opening the vent port 122. The clutch 58 is disengaged and held in the disengaged position by the coil spring 114 in the vacuum motor 92 acting on the shifter 81 via the push-pull cable 90.

When the vehicle is driven in the two-wheel drive mode, the lower wheel 30 shown in FIG. 1 back drives the differential side gear 52 but the upper wheel 30 does not back drive the differential side gear 50 because the clutch 58 is disengaged. Since the side gear 50 does not have any load, the side gear 52 merely counter-rotates the side gear 50 through the pinion gears 46. Hence, there is no back drive to the differential case 38, drive shaft 36 (differential input), front propeller shaft 36, auxiliary output shaft 18 and other transfer case components connected to the auxiliary output shaft 18 ahead of the disconnect in the transfer case 14. This mode of operation eliminates the major portion of wear and power consumption which would result from back drive of both wheels 30.

It should also be noted that the control system does not require any power for operation in the two-wheel drive mode since the vacuum motor 92 is vented and the solenoid operated two-way slide valve 94 is deenergized. Consequently, the control system itself enhances fuel economy in the two-wheel drive mode.

When the four-wheel drive mode is selected by the vehicle operator, the auxiliary output shaft 18 is drive connected to the input shaft in the transfer case 14 and the switch 154 is closed, setting off two chains of events which result in the clutch 58 automatically being engaged.

The transfer case output shaft 18 now drives the drive shaft 36 (differential input) and the differential case 38. The driven or rotating differential case 38 in turn reverses the counter-rotating side gear 50 so that the side gear 50 and stub shaft 54 rotate in the same direction as the side gear 52 and the extension shaft 64 which are driven by the respective front vehicle wheels 30. In time, the driven differential case 38 tends to synchronize the speeds of the stub shaft 54 and the extension shaft 64.

In the meantime, the closed switch 154 energizes the solenoid coil 136 of the two-way slide valve 94 retracting the slide member 128. The retracted slide member 128 closes the vent port 122 and opens the vacuum port 124 which connects the chamber 108 of vacuum motor 92 to the vacuum source provided by the internal combustion engine 10 through hose 102, vacuum check valve 96, hose 100, vacuum port 124, radial port 126, orifice device 103, rubber hose 98 and port 117.

The vacuum chamber 108 is then evacuated, producing a clutch engage force which collapses the diaphragm 106 against the action of spring 114 and pulls the slide 84 to the left from the solid line position shown in FIG. 3 via the cable 90. Movement of the slide 84 loads the coil spring 88 which biases the shifter fork 82 and sleeve 68 toward the clutch engage position. The sleeve 68 then slides into engagement with the spline wheel 62 under the action of spring 88 when their respective splines align in a complementary manner. When the clutch 58 is engaged, as shown in phantom in FIG. 3, both front wheels 30 are driven and the split axle drive mechanism 28 acts as a conventional differential.

The orifice device 103 provides a time delay of approximately two to three seconds between the time that the switch 154 is closed and the vacuum chamber 108 is evacuated. This time delay is provided so that rotation of the counter-rotating side gear 50 is reversed and the sleeve 68 is rotating in the same direction as the spline wheel 62 before any substantial clutch engage force is produced by the vacuum motor 92. This time delay feature permits the vehicle operator to shift the transfer case 14 from two-wheel drive to four-wheel drive while the vehicle is in motion.

Another feature which should be noted is the vacuum check valve 96 which keeps the chamber 108 evacuated once it is evacuated by the engine intake manifold. This feature prevents the evacuated chamber 108 from being bled down by a low vacuum in the engine intake manifold such as in a steep, four-wheel drive, hillclimb.

The clutch 58 is also automatically disengaged when the vehicle is returned to the two-wheel drive. When the two-wheel drive mode is selected at the transfer case 14, the switch 154 opens deenergizing the solenoid coil 136. The slide member 128 is then biased by spring 134 to the position shown in FIG. 3 where the vacuum port 124 is closed and the vent port 122 is opened. The chamber 108 is now vented and the diaphgram 106 extends, aided by the coil spring 114. This in turn pushes the slide 84 via the push-pull cable 90 to the clutch disengaged position shown in FIG. 3 which loads the coil spring 86. The coil spring 86 then biases the fork 82 and sleeve 68 toward the solid line position shown in FIG. 3. The clutch 58 then automatically disengages when the force of spring 86 is sufficient to overcome the torque loading between the spline wheel 62 and the sleeve 68 which usually occurs with a slight deceleration of the vehicle. When the clutch 58 is disengaged, there is no back drive to the differential case 38 as indicated earlier.

It should be noted that shifter 81 provides a redundancy when used in conjunction with the control system illustrated in FIG. 3. The coil springs 86 and 88 bias the sleeve 68 toward the disengaged and engaged position, respectively, so that the clutch 58 is not engaged and disengaged with excessive force which could happen if the shift fork 82 was operated by a solid mechanical linkage.

Since the vacuum motor 92 itself provides controlled clutch engagement and disengagement forces, it is possible to simplify the shifter 81 by eliminating the springs 86 and 88 and fixing the shift fork 82 on the slide 84 so that the push-pull cable 90 moves the shift fork 82 directly.

It wish it to be understood that I do not desire to be limited to the exact details of construction shown and described, for obvious modifications will occur to a person skilled in the art.

The embodiments of the invention in which an exclusive property or privilege is claimed are defined as follows:

1. A control system for automatically operating the clutch in a single clutch split axle drive mechanism responsive to an operational mode of a transfer case, with which the split axle drive mechanism is used in a part-time four-wheel drive vehicle powered by an internal combustion engine, comprising:
   a vacuum motor mechanically connected to the clutch so that the clutch is biased toward disengagement when the vacuum motor is vented and biased toward engagement when the vacuum motor is evacuated,
   conduit means connecting the vacuum motor to a vacuum source provided by the internal combustion engine,
   said conduit means including a two-way valve which has a first operative position where the vacuum motor is connected to a vent and a second operative position where the vacuum motor is connected to the vacuum source for evacuating the vacuum motor,
   means operatively connected to the transfer case positioning the two-way valve in the second operative position when the transfer case is in a four-wheel drive mode whereby the clutch is automatically engaged when four-wheel drive is selected, and
   said two-way valve being mechanically positioned in the fist operative position when the transfer case is in the two-wheel drive mode whereby the control system does not require any power for operation in the two-wheel drive mode.

2. A control system for automatically operating the clutch in a single clutch split axle drive mechanism responsive to an operational mode of a transfer case, with which the split axle drive mechanism is used in a part-time four-wheel drive vehicle powered by an internal combustion engine, comprising:
   a vacuum motor operatively connected to the clutch so that the clutch is biased toward disengagement when the vacuum motor is vented and biased toward engagement when the vacuum motor is evacuated,
   conduit means connecting the vacuum motor to a vacuum source provided by the internal combustion engine,
   said conduit means including a two-way valve which has a first operative position where the vacuum motor is vented and a second operative position where the vacuum motor is evacuated by the vacuum source,
   means positioning the two-way valve in the second position when the transfer case is in a four-wheel drive mode whereby the clutch is automatically engaged when four-wheel drive is selected, and
   time delay means in the conduit means for delaying clutch engagement to a time after the transfer case is shifted to four-wheel drive, so that the clutch parts are rotating in the same direction and four-wheel drive can be selected while the vehicle is in motion.

3. A control system for automatically operating the clutch in a single clutch split axle drive mechanism responsive to an operational mode of a transfer case, with which the split axle drive mechanism is used in a part-time four-wheel drive vehicle powered by an internal combustion engine, comprising:
   a vacuum motor mechanically connected to the clutch so that the clutch is biased toward disengagement when the vacuum motor is vented and biased toward engagement when the vacuum motor is evacuated,
   conduit means connecting the vacuum motor to the intake manifold of the internal combustion engine for evacuating the vacuum motor,
   said conduit means including a two-way valve which has a first operative position where the vacuum motor is vented and a second operative position where the vacuum motor is connected to the vacuum source,
   electric means operatively connected to the transfer case positioning the two-way valve in the second operative position when the transfer case is in a four-wheel drive mode whereby the clutch is automatically engaged when four-wheel drive is selected, and
   a vacuum check valve in the conduit means between the two-way valve and the intake manifold for preventing bleed down of the evacuated vacuum motor by the intake manifold.

4. A control system for automatically operating the clutch in a single clutch split axle drive mechanism responsive to an operational mode of a transfer case, with which the split axle drive mechanism is used in a part-time four-wheel drive vehicle powered by an internal combustion engine, comprising:

a vacuum motor mechanically connected to the clutch so that the clutch is biased toward disengagement when the vacuum motor is vented and biased toward engagement when the vacuum motor is evacuated, conduit means connecting the vacuum motor to the intake manifold of the internal combustion engine for evacuating the vacuum motor, said conduit means including a two-way valve which has a first operative position where the vacuum motor is vented and a second operative position where the vacuum motor is connected to the vacuum source, spring means positioning the valve in the first operative position, electric means positioning the two-way valve in the second operative position when the transfer case is in a four-wheel mode whereby the clutch is automatically engaged when four-wheel drive is selected, pneumatic time delay means in the conduit means between the vacuum motor and the two-way valve for delaying the clutch engagement for a predetermined minimum amount of time after the transfer case is shifted to four-wheel drive so that the clutch parts are rotating in the same direction when four-wheel drive is selected while the vehicle is in motion, and a vacuum check valve in the condition means between the two-way valve and the intake manifold for preventing bleed down of the evacuated vacuum motor by the intake manifold.

5. In a part-time four-wheel drive vehicle having a source of vacuum, a transfer case having a two-wheel drive operating mode and a four wheel drive operating mode, and a split axle drive mechanism having a single clutch moveable between disengaged and engaged positions for the two-wheel drive and four-wheel drive operating modes, respectively, a control system for automatically operating the clutch responsive to the operational mode of the transfer case, comprising:

a vacuum motor, means operatively connecting the vacuum motor to the clutch for biasing the clutch toward the engaged position when the vacuum motor is evacuated, and biasing the clutch toward the disengaged position when the vacuum motor is vented to atmosphere, conduit means connected between the vacuum motor and the vacuum source, said conduit means including valve means moveable between first and second positions for alternately connecting the conduit means to atmosphere or to the vacuum source, means normally locating the valve means in the first position to connect the conduit means to atmosphere and maintain the clutch disengaged, signal means actuated by the transfer case when in the four-wheel drive operating mode for indicating such mode to the vehicle operator, and means actuated by the transfer case concurrently with actuation of the signal means for moving the valve means to the second position to connect the vacuum motor to the vacuum source and evacuate the vacuum motor to bias the clutch toward the engaged position when the transfer case is in the four-wheel drive operating mode, and time delay means delaying evacuation of the vacuum motor by the vacuum source to a time after the transfer case is in the four-wheel drive operating mode so that the clutch parts are rotating in the same direction and four-wheel drive can be selected while the vehicle is in motion.

6. A control system for automatically operating the clutch in a single clutch split axle drive mechanism responsive to an operational mode of a transfer case, with which the split axle drive mechanism is used in a part-time four-wheel drive vehicle powered by an internal combustion engine, comprising:

a vacuum motor operatively connected to the clutch so that the clutch is biased toward disengagement when the vacuum motor is vented and biased toward engagement when the vacuum motor is evacuated, conduit means connecting the vacuum motor to a vacuum source provided by the internal combustion engine, said conduit means including a two-way valve which has a first operative position where the vacuum motor is vented and a second operative position where the vacuum motor is evacuated by the vacuum source, means positioning the two-way valve in the second position when the transfer case is in a four-wheel drive mode whereby the clutch is automatically engaged when four-wheel drive is selected, and time delay means for delaying clutch engagement to a time after the transfer case is shifted to four-wheel drive, so that the clutch parts are rotating in the same direction and four-wheel drive can be selected while the vehicle is in motion.

7. A control system for automatically operating the clutch in a single clutch split axle drive mechanism responsive to an operational mode of a transfer case, with which the split axle drive mechanism is used in a part-time four-wheel drive vehicle powered by an internal combustion engine, comprising:

a vacuum motor mechanically connected to the clutch so that that clutch is biased toward disengagement when the vacuum motor is vented and baised toward engagement when the vacuum motor is evacuated, conduit means connecting the vacuum motor to the intake manifold of the internal combustion engine for evacuating the vacuum motor, said conduit means including a two-way valve which has a first operative position where the vacuum motor is vented and a second operative position where the vacuum motor is connected to the vacuum source, spring means positioning the valve in the first operative position, means positioning the two-way valve in the second operative position when the transfer case is in a four-wheel drive mode whereby the clutch is automatically engaged when four-wheel drive is selected, pneumatic time delay means for delaying the clutch engagement for a predetermined minimum amount of time after the transfer case is shifted to four-wheel drive so that the clutch parts are rotating in the same direction when four-wheel drive is selected while the vehicle is in motion, and a vacuum check valve in the conduit means between the two-way valve and the intake manifold for preventing bleed down of the evacuated vacuum motor by the intake manifold.

8. In a part-time four-wheel drive vehicle having a source of vacuum, a transfer case having a two-wheel drive operating mode and a four-wheel drive operating mode, and a split axle drive mechanism having a single clutch moveable between disengaged and engaged positions for the two-wheel drive and four-wheel drive operating modes, respectively, a control system for automatically operating the clutch responsive to the operational mode of the transfer case, comprising:

a vacuum motor, means operatively connecting the vacuum motor to the clutch for biasing the clutch toward the engaged position when the vacuum motor is evacuated, and biasing the clutch toward the disengaged position when the vacuum motor is vented to atmosphere, conduit means connected between the vacuum motor and the vacuum source, said conduit means including valve means moveable between first and second positions for alternately connecting the conduit means to atmosphere or to the vacuum source, means normally locating the valve means in the first position to connect the conduit means to atmosphere and maintain the clutch disengaged, means actuated by the transfer case for moving the valve means to the second position to connect the vacuum motor to the vacuum source and evacuate the vacuum motor to bias the clutch toward the engaged position when the transfer case is in the four-wheel drive operating mode, and time delay means delaying evacuation of the vacuum motor by the vacuum source to a time after the transfer case is in the four-wheel drive operating mode so that the clutch parts are rotating in the same direction and four-wheel drive can be selected while the vehicle is in motion.

* * * * *